(12) United States Patent
Alebachew et al.

(10) Patent No.: US 9,226,249 B2
(45) Date of Patent: Dec. 29, 2015

(54) MODIFIED SIR VALUES FOR FAST POWER CONTROL

(75) Inventors: Girum Alebachew, Kista (SE);
Carmela Cozzo, San Diego, CA (US);
Gregory E. Bottomley, Cary, NC (US);
Fredrik Huss, Sundbyberg (SE);
Gunnar Peters, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1328 days.

(21) Appl. No.: 12/513,972

(22) PCT Filed: Nov. 7, 2006

(86) PCT No.: PCT/SE2006/050458
§ 371 (c)(1),
(2), (4) Date: May 7, 2009

(87) PCT Pub. No.: WO2008/057018
PCT Pub. Date: May 15, 2008

(65) Prior Publication Data
US 2010/0027590 A1 Feb. 4, 2010

(51) Int. Cl.
*H04B 1/707* (2011.01)
*H04W 52/60* (2009.01)
*H04B 1/712* (2011.01)
*H04W 52/24* (2009.01)

(52) U.S. Cl.
CPC ............... *H04W 52/60* (2013.01); *H04B 1/712* (2013.01); *H04W 52/241* (2013.01); *H04B 2201/709727* (2013.01)

(58) Field of Classification Search
CPC ........................................................ H04B 1/707
USPC .................................. 375/130, 140, 147, 148
See application file for complete search history.

(56) References Cited

U.S. PATENT DOCUMENTS

| 6,292,519 B1 | 9/2001 | Popovic | |
| 2005/0201447 A1* | 9/2005 | Cairns et al. | 375/148 |
| 2006/0007990 A1* | 1/2006 | Cozzo et al. | 375/148 |
| 2006/0233268 A1* | 10/2006 | Frank et al. | 375/260 |
| 2007/0177729 A1* | 8/2007 | Reznik et al. | 380/44 |

FOREIGN PATENT DOCUMENTS

WO    WO 2004/051902 A1    6/2004

* cited by examiner

*Primary Examiner* — Kevin M Burd

(57) ABSTRACT

The present invention relates to a receiver comprising a fast power control unit, said fast power control unit being arranged to continuously control a quality measure of a radio channel. The receiver is characterized in that the quality measure is a modified Signal to Interference plus noise ratio (SIR) in which the influence from self interference has been removed. The invention further relates to a method for continuously controlling a quality measure of a radio channel, wherein a modified Signal to Interference plus noise ratio (SIR) is continuously determined in which the influence from self interference has been removed.

23 Claims, 5 Drawing Sheets

MODIFIED SIR VALUES FOR FAST POWER CONTROL

TECHNICAL FIELD OF THE INVENTION

The present invention relates to a receiver comprising a fast power control unit, said fast power control unit being arranged to continuously control a quality measure of the radio channel.

The present invention also relates to a method for continuously controlling a quality measure of a radio channel.

DESCRIPTION OF RELATED ART

The fast power control loop in a CDMA system has two purposes. First, it is used to maintain the Carrier to Interference ratio (C/I) needed for a given quality of service. The quality is measured in Block Error Rate (BLER), Bit Error Rate (BER), throughput or some other measure. To optimise the capacity of the system it is important that the Carrier to Interference ratio (C/I) is neither too small nor too large. Secondly, the fast power control is used to combat fast fading.

However, in the fast power control loop it is common to measure the Signal to Interference plus noise Ratio (SIR) instead of the Carrier to Interference ratio (C/I) and use the Signal to Interference plus noise Ratio (SIR) as an indication of the Carrier to Interference ratio (C/I). The relationship between SIR and C/I depends on the fading profile of the channel, bit rate and power settings of the transmission. The fast power control can however operate without knowledge of the relationship between SIR and C/I and thus without knowledge of the C/I. Instead, the fast power control controls an estimated SIR of some known pilots or easily detected control symbols against a desired SIR target. The SIR target is adapted in a slower control loop, denoted outer power control. The outer power control involves increasing or decreasing the SIR target in response to a measured quality of service.

A problem with power control addressed herein, is the problem with self interference. For low Carrier to Interference ratios and for fading profiles with few rays, the self interference is negligible in relation to the noise while for high Carrier to Interference ratios and dispersive channels the self interference is dominating. In the first-mentioned case with low Carrier to Interference ratios and fading profiles the relationship between the transmitting power and SIR is almost linear. In the latter case on the other hand with high Carrier to Interference ratios and dispersive channels, the relationship between transmitting power and the SIR is highly non-linear and the SIR value converges towards an asymptotic value with increasing transmitting power. This may cause the power control loop to break down and power rushes to occur. The consequence is that full throughput can not be reached for high bit rate services and highly dispersive radio channels.

US 2005/0201447 relates to a method and apparatus for estimating signal impairment correlations for one or more received signals of interest using a model-based technique, wherein the model is adapted in response to recurring measurements of signal impairment correlations that can be made on frequent basis. Thereby, even rapidly changing signal impairment correlations can be tracked. In detail, received signal impairment correlations are determined for use in generating RAKE combining weights.

SUMMARY

One object of the present invention is to provide a way of adapting the SIR so that it will be highly dependent on the transmitted power also for high Carrier to Interference ratios and dispersive channels.

In accordance with one embodiment of the present invention this has been solved by means of a receiver comprising a fast power control unit, said fast power control unit being arranged to continuously update a quality measure of a radio channel. The receiver is characterized in the quality measure is a modified Signal to Interference plus noise ratio (SIR) in which the influence from self interference has been removed.

As the self interference destroys the SIR estimate as a good control variable for high Carrier to Interference ratios and dispersive channels, removing the influence from self interference will result in stable fast power control.

The fast power control unit is arranged to compare the determined quality measure with a predetermined quality value and to, based on said comparison broadcast a message to a transmitter for amending the transmitting power.

In accordance with one embodiment of the invention, wherein the power settings of the transmitted codes is not known the fast power control unit comprises a processing unit comprising a parametric model of the radio channel determined at least based on known, demodulated pilots. The model comprises a self interference impairment term $R_{ISI}$ scaled by a first fitting parameter A and a noise impairment term $R_n$ scaled by a second fitting parameter B. The processing unit is arranged to adapt values of the first and second fitting parameters A, B to fit the model to measured received pilots for example using a Least Square method. The model of the radio channel is for example described by the equation $R_m = A \cdot R_{ISI} + B \cdot R_n$. The self interference covariance matrix $R_{ISI}$ of the equation can be determined based on at least received demodulated pilots and path delays in the radio channel. The processing unit is arranged to determine the modified SIR as a relation between a signal power or the like, the second parameter B and the noise impairment term $R_n$.

The first and second parameters A and B are by definition non-negative. However, the estimates of the parameters can turn out to be negative anyway. The likelihood for the estimated first parameter A, to be negative increases when self interference is low and the true value close to zero. In order to improve the calculations the processing unit is therefore in accordance with one embodiment of the invention arranged to determine when the fitted first parameter A decreases below a preset value, to thereupon set the first parameter A to zero and re-estimate the value of the second parameter B and to use the re-estimated second parameter B in determining the modified SIR.

In order to further improve the estimate of at least the second parameter B the processing unit is arranged to filter the possibly re-estimated second parameter B with a Minimum Mean Squared Error (MMSE) based smoothing method and to use the filtered second parameter B in determining the modified SIR. In an extended embodiment also the first parameter A is filtered with the Minimum Mean Squared Error (MMSE) based smoothing method.

If a limited number of pilot symbols are available, the estimate can be quite noisy. Accordingly, in accordance with one embodiment of the invention is the variance reduced by applying post-filtering in a filter having low-pass characteristics.

In accordance with one embodiment of the invention the fast power control unit is arranged to operate in interaction with a RAKE receiver. The RAKE receiver is then arranged to feed known pilots from the respective finger outputs of the RAKE to the fast power control unit. In order to increase the robustness of the determination of the modified Signal to Interference plus noise ratio (SIR), the RAKE comprises in accordance with one embodiment of the invention at least one finger output for each fading path in the radio channel. As the number of RAKE fingers used in a RAKE combiner for the received data is not as critical as the number of RAKE fingers used by the fast power control unit, the number of finger outputs of the RAKE receiver fed to the fast power control unit is larger than the number of finger outputs fed to a RAKE combiner for data processing.

In an alternative embodiment of the present invention, wherein the power settings of transmitted codes are known, a processing unit arranged to calculate the self interference comprises a power estimation unit arranged to estimate a signal power or the like and a noise power or the like of the pilots or a code in which the pilots are incorporated from each RAKE finger output, and to estimate the total signal power or the like over all codes for each finger output using the signal power or the like on the pilots or the code in which the pilots are incorporated and known power settings of the transmitted codes. The processing unit further comprises a self interference estimating unit arranged to estimate the self interference for each finger output as the contribution of the total signal power or the like over all codes and all finger outputs except the finger output for which the self interference is estimated.

In order to decrease the variance of the self interference, the processing unit comprises in accordance with one embodiment of the invention a post-filtering unit arranged to filter the self interference estimated in the self interference estimating unit by means of a filter having low-pass characteristics.

The processing unit comprises also a total interference estimating unit arranged to estimate the total interference for each finger output. In order to decrease the variance of the total interference, the processing unit can comprise a post-filtering unit arranged to filter the total interference estimated in the total interference estimating unit by means of a filter having low-pass characteristics. A SIR estimation unit is arranged to estimate the modified SIR for example as a ratio between an estimated signal power and a difference between the possibly post-filtered total interference and the possibly post-filtered self interference.

In accordance with one embodiment of the invention, the receiver is a CDMA, for example a WCDMA receiver.

The present invention relates further to a wireless communication terminal for use in a wireless communication network comprising a receiver in accordance with the above.

The present invention relates further to a radio base station for use in a wireless communication network comprising a receiver in accordance with the above.

The present invention also relates to a method for continuously updating a quality measure of a radio channel. The method is characterized in that it comprises continuously determining a modified Signal to Interference plus noise ratio (SIR) in which the influence from self interference has been removed.

In accordance with one embodiment of the invention the continuous determination of the modified Signal to Interference plus noise ratio (SIR) comprises the steps of
determining a self interference impairment term $R_{ISI}$ scaled by a first fitting parameter A,
determining a noise impairment term $R_n$ scaled by a second fitting parameter B,
adapt the first and second fitting parameters A, B to fit a model of the radio channel to measured received pilots, and
determining the modified SIR as a relation between a signal power or the like, the second parameter B and the noise impairment term $R_n$.
Further features of these embodiments are described in the dependent claims 23-28.

In accordance with an alternative embodiment of the present invention estimation of the self interference involves
estimating a signal power or the like and a noise power or the like of pilots or a code in which the pilots are incorporated from each finger output of a RAKE receiver,
estimating the total signal power or the like over all codes for each finger output using the signal power or the like on the pilots or the code in which the pilots are incorporated and known power settings of the transmitted codes, and
estimating the self interference for each finger output as the contribution of the total signal power or the like over all codes and all finger outputs except the finger output for which the self interference is estimated. The total interference is then estimated and the difference between the total interference and the self interference is used in determination of the modified SIR.

The present invention also relates to a method for fast power control, characterized by the steps of continuously updating a quality measure of a radio channel in accordance with any of the method embodiments described above, comparing the determined quality measure with a predetermined quality value, and based on said comparison broadcasting a message to a transmitter for amending the transmitting power.

The present invention also relates to a computer program product comprising computer readable code means which, when run on a computer system performs the method in accordance with any of the method embodiments described above.

DETAILED DESCRIPTION OF PREFERRED EMBODIMENTS

Figure 1:
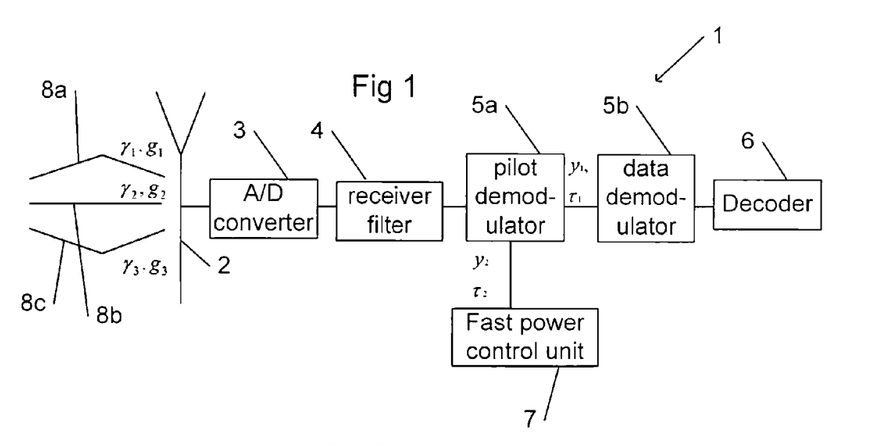
FIG. 1 shows a block diagram over a receiving unit in accordance with one example of the present invention.

In FIG. 1 a receiving unit 1 comprises one antenna 2 arranged to receive a signal carried through the air, an A/D converter 3, a receiver filter 4, a pilot demodulator 5a, a data demodulator 5b, a decoder 6 and a fast power control unit 7.

The signal received by the antenna 2 is for example a radio signal. Further, the signal is composed by a number L of rays $\{r_k\}_{k=1}^{L}$ 8a, 8b, 8c transmitted through the air, each ray 8a, 8b, 8c reaching the antenna 2 from an individual fading path. In the example of FIG. 1, three rays are shown. Each ray has its own attenuation and phase shift described by the channel. In FIG. 1, the rays are described by their power $\{\gamma_k\}_{k=1}^{L}$ and channel response $\{g(t)_k\}_{k=1}^{L}$.

The signal is transmitted by means of CDMA (Code Division Multiple Access) transmission. Accordingly, N orthogonal spreading codes $\{C_i\}_{i=0}^{N-1}$ are transmitted, wherein one or several codes are used for user data and one or several codes are used for control data. The codes have power settings $\{\beta_i^2\}_{i=0}^{N-1}$, describing the power distribution between the codes, and spreading factors $\{SF_i\}_{i=0}^{N-1}$. Further, it is assumed that for example $C_0$ contains known pilots.

The total received signal power at the antenna 2 is then given by the equation $$C = \left(\sum_{i=0}^{N-1} \beta_i^2\right) \cdot \left(\sum_{k=1}^{L} \gamma_k\right).$$

In an alternative embodiment (not shown), the receiving unit comprises two or more antennas.

The signal received by the antenna 2 is processed in an analogue radio receiver and transmitted to the A/D converter 3 arranged to convert the received analogue signal to a time discrete signal suitable for further processing. The converted signal is fed to the receiver filter 4. The function of the receiver filter 4 will not be described in detail herein.

The pilot and data demodulators 5a, 5b, are arranged to demodulate the received signal, whereby the influence on the signal resulting from the multipath propagation is removed. This will not be described in detail herein. However, in brief, a conventional RAKE receiver can be used for this purpose. RAKE receivers are well known in the communication arts and find widespread use in Code Division Multiple Access (CDMA) systems, such as in IS-95, IS-2000 (cdma2000) and Wideband CDMA (WCDMA) wireless communication networks. In general, multiple, parallel receiver fingers are used to receive multiple signal images in a received multipath signal. By coherently combining the finger outputs in a RAKE combiner, the RAKE receiver can use multipath reception to improve the Signal-to Noise Ratio of the received multipath signal.

In an alternative example, a so called parametric generalized RAKE is used in the demodulators 5a, 5b. The parametric generalized RAKE is arranged to calculate RAKE combining weights and SIR estimates by providing a model of received signal impairment correlations for the received signal comprising an interference impairment term scaled by a first fitting parameter A and a noise impairment term scaled by a second fitting parameter B, measuring received signal impairment correlations at each of one or more successive time instants, and, at each time instant, fitting the model to measured received signal impairment correlations by adapting instantaneous values of the first and second fitting parameters A, B, and maintaining the model by updating the first and second parameters A. B, based on the instantaneous values calculated for them at each instant. The impairment correlations are used to calculate alternative/new weights for the RAKE combiner.

The pilot demodulator 5a is arranged to demodulate the pilots, as discussed above for example contained in the code $C_0$. The pilot demodulator 5a then provides a first set of demodulated pilots $y_1$ along with information related to a path delay $\tau_1$ for each fading path having at least a minimum quality and received by the antenna 2.

There exist searcher methods well known in the art for obtaining the path delays $\tau_1$ for the fading paths, and accordingly this will not be described in detail. Other time delays in addition to the path delays may be used. The first set of demodulated pilots $y_1$ along with associated time delays $\tau_1$ are fed to the data demodulator 5b. The data demodulator 5b is arranged to demodulate the data with the aid of the pilots $y_1$ with associated path delays $\tau_1$ using RAKE fingers corresponding to the fingers used in providing the pilots $y_1$ with associated path delays $\tau_1$. The demodulated data signal is then fed to the decoder 6, wherein the data signal is decoded.

The pilot demodulator 5a also provides a second set of demodulated pilots $y_2$ along with information related to a path delay $\tau_2$ for each fading path having at least a minimum quality and received by the antenna 2 (this minimum quality can be different than the minimum quality required for providing the demodulated pilots $y_1$ to the data demodulation unit 5b). The second set of demodulated pilots $y_2$ along with associated path delays $\tau_2$ are fed to the fast power control unit 7.

In one example, the pilot demodulator 5a is arranged to provide the same set of demodulated pilots $y_1$, $y_2$ to the data demodulator 5a and to the fast power control unit 7. In another example, the first set of demodulated pilots $y_1$ is a subset of the second subset of demodulated pilots $y_2$. In yet another example, different RAKE:s are used for providing the first and second set of demodulated pilots.

Figure 2:
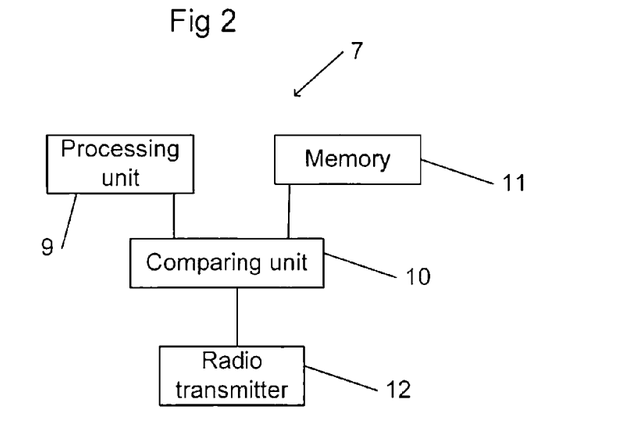
FIG. 2 shows a block diagram over a fast power control unit of the system in FIG. 1.

In FIG. 2, the fast power control unit 7 comprises a processing unit 9 arranged to frequently update a quality measure of the signal incoming to the antenna 2, a comparing unit 10 arranged to compare the quality measure with a quality measure target value stored in a memory 11 and a radio transmitter 12 arranged to broadcast a message in dependence of the result of the comparison. Characteristically, the quality measure is updated 1000 times per second or more for example 1500 times per second. Conventionally, the processing unit 9 of the fast power control unit 7 is arranged to calculate an estimated Signal to Interference plus noise Ratio (SIR) of the known pilots $y_2$ or easily detected control symbols and to feed the calculated SIR value to the comparing unit 10 arranged to compare the calculated SIR with a set SIR target. The SIR target is set for example based on the number of fading paths received by the antenna: the setting of the SIR target will not be described in detail herein. If the comparison shows that the SIR lies outside allowable ranges for the SIR target, the radio transmitter 12 is arranged to broadcast a message informing that the power of the transmission has to be altered. This is called fast power control. In using the fast power control, the fast fading of the channels g can be compensated for so that it is secured that a desired Block Error Rate (BLER), Bit Error Rate (BER), throughput or some other measure of the signal quality is achieved.

In accordance with the present invention the processing unit 9 is arranged to calculate an estimated, modified SIR value. The modified SIR value is then used for comparison with a SIR target.

Figure 3:
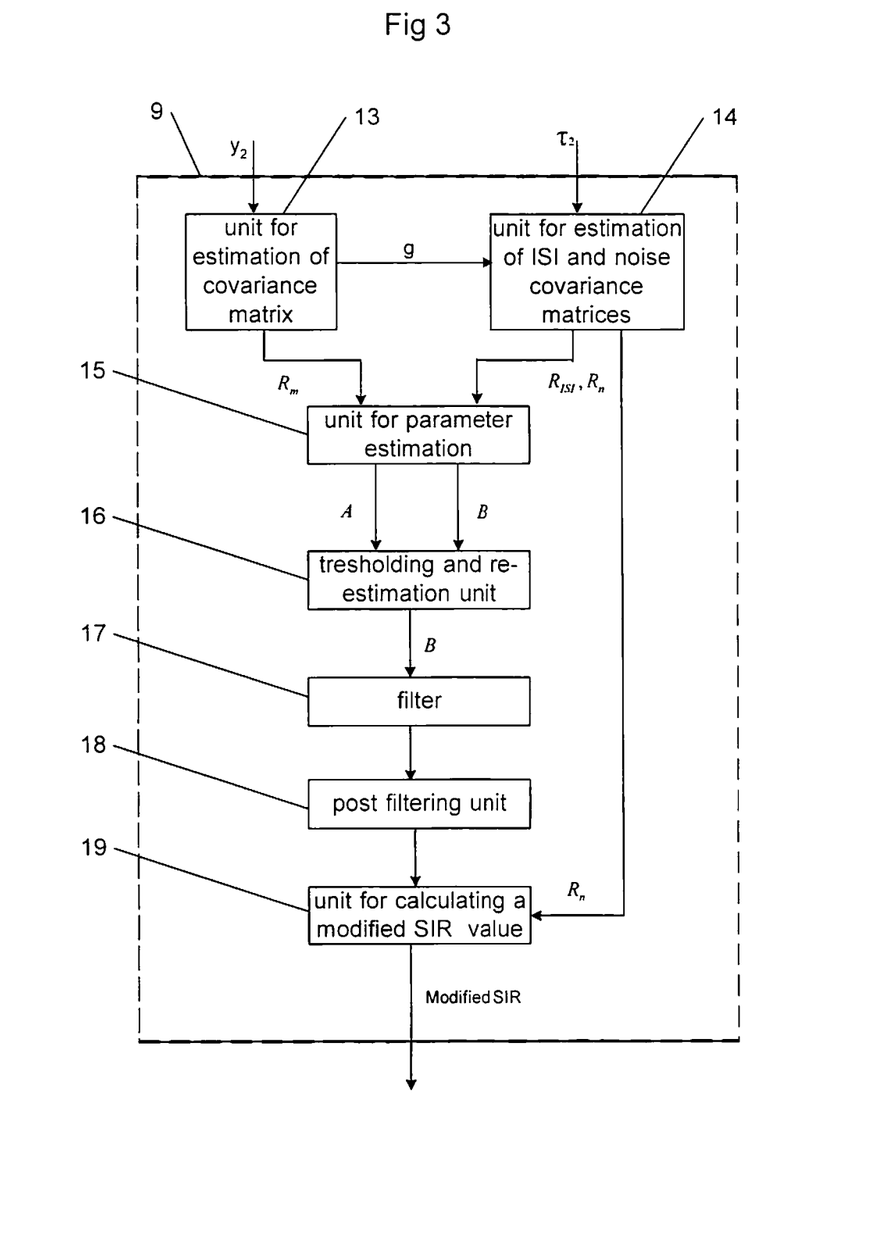
FIG. 3 shows a block diagram over a processing unit of the fast power control unit in FIG. 2 in accordance with one example of the present invention.

In FIG. 3, the execution steps executed by the processing unit 9 of the fast power control unit 7 for calculating the estimated, modified SIR value are shown. In a first processing step, a unit 13 for estimation of covariance matrix is arranged to estimate a covariance matrix $R_m$ from the received demodulated pilots $y_2$. The demodulated pilots $y_2$ are derived from each finger output of the RAKE receiver, as described above.

In one example, the estimation of the covariance matrix $R_m$ involves estimating the channel response for each finger of the RAKE receiver. We denote the channel response experienced by the receiver, i.e. filtered by receiver and transmitter filters, the net channel response. The net channel response could for example be estimated as $$c_k = \frac{1}{p}\sum_{i=0}^{p-1} y_{2,k}(i)$$

The covariance matrix $R_m$ is then estimated per slot from p demodulated pilot symbols $y_2$. The k:th row and l:th column of $R_m$ is calculated as $$R_m(k,l) = \frac{1}{p-1}\sum_{i=0}^{p-1}(y_{2,k}(i)-c_k)\cdot(y_{2,l}(i)-c_l)^*$$

where $y_{2,k}(i)$ and $y_{2,l}(i)$ are the i:th demodulated pilot symbols and $c_k$ and $c_l$ are the net channel responses, for finger k and l, respectively, and wherein * denotes complex conjugation.

In a second processing step, a unit 14 for estimation of Intersymbol Interference and noise covariance matrices is arranged to calculate said Intersymbol Interference covariance matrix $R_{ISI}$ and said noise covariance matrix $R_n$. The self-interference component of the covariance between two fingers with delays $d_1$ and $d_2$ is calculated as $$R_{ISI}(d_1, d_2) = \sum_l \sum_q g_l \cdot g_q^* \sum_{m=-\infty, m\neq 0}^{\infty} R_p(d_1 - mT_c - \tau_{2,l})\cdot R_p^*(d_2 - mT_c - \tau_{2,q})$$

wherein the summation over l runs over all paths originating from the same antenna as the finger with delay $d_1$, while the summation over q runs over all paths originating from the same antenna as the finger with delay $d_2$:
wherein $\tau_{2,l}$, are the path delays for the paths originating from the same antenna as the finger with delay $d_1$ and $\tau_{2,q}$ are the path delays for the paths originating from the same antenna as the finger with delay $d_2$; the path delays are in-signals to the second processing step and are for example calculated using known searcher methods, as discussed above,
wherein $g_l$ are the medium channel responses for the paths originating from the same antenna as the finger with delay $d_1$ and $g_q$ are the medium channel responses for the paths originating from the same antenna as the finger with delay $d_2$; the medium channel responses $g_l$, $g_q$ are estimated from the net channel estimates c by removing the influence of the receiver and transmitter filters. This constitutes normal steps to a person skilled in the art, see for example US patent application US 2005/0201447.

The noise component of the covariance between two fingers with delays $d_1$ and $d_2$ is calculated as $$R_n(d_1, d_2) = \begin{cases} R_p(d_1-d_2) & \text{if } d_1 \text{ and } d_2 \text{ belong to the same antenna} \\ 0 & \text{otherwise.} \end{cases}$$

Now, a model of the covariance matrix can be denoted $$R_m = A\cdot R_{ISI} + B\cdot R_n,$$

wherein $R_m$, $R_{ISI}$ and $R_n$ have been estimated in the first and second processing steps.

The parameters A and B in the model above are estimated in a third processing step by a unit 15 for parameter estimation. The estimation of the parameters A and B will not be described more in detail herein. A person skilled in the art would be able to solve the equation system above using computer aided methods. For example, a Least Square method can be used in determining the parameters A and B.

The parameters A and B are by definition non-negative. However, during some circumstances, the estimates of the parameters A and B provided by the parameter estimation unit using for example the least square method, may be negative values. The likelihood for the estimated parameter A to be negative is increased in environments with low self interference, wherein the A value is close to zero.

The estimate for B is in one example further improved by a thresholding and reestimation unit 16 in a fourth processing step. The fourth processing step includes the following thresholding and re-estimation procedure.

If α<Threshold then set A=0 and re-estimate B as specified below, wherein Threshold is a preset design parameter designed so as to optimize the performance of the algorithm.

In order to re-estimate B, the matrix $B\cdot R_n$ is fitted to the covariance matrix $R_m$. The diagonal elements of these matrixes give a set of real equations. The off-diagonal elements, if used, give a set of complex equations which can be treated as two sets of equations, one set representing the real part of the equations and the other set representing the imaginary part of the equations.

For example, suppose there are two fingers and $$R_m = \begin{bmatrix} m_{11} & m_{12} \\ m_{12}^* & m_{22} \end{bmatrix}, R_n = \begin{bmatrix} r_{11} & r_{12} \\ r_{12}^* & r_{22} \end{bmatrix}$$

This gives the following four fitting equations $$m_{11} = Br_{11} \quad (1)$$

$$m_{22} = Br_{22} \quad (2)$$

$$Re\{m_{12}\} = BRe\{r_{12}\} \quad (3)$$

$$Im\{m_{12}\} = BIm\{r_{12}\} \quad (4)$$

Standard least-squares approaches can be used to find B. Typically, the imaginary part of $r_{12}$ is zero. In this case, it may be advisable to drop equation (4). Further, for widely spaced RAKE fingers, the real part of $r_{12}$ may be zero or at least very small. In this case, it may be advisable to drop equation (3) as well.

If the parameter B determined by the parameter estimation unit 15 could be <0 then B=0, in which case the thresholding and re-estimation unit 16 is by-passed. If the parameter B determined by the thresholding and re-estimation unit 16 in one example is <0 then B is set to B=0.

In one example, the parameter B determined by the thresholding and re-estimation unit 16, or if such unit is not present or by-passed, determined by the parameter estimation unit 15, is fed to a filter 17 arranged to filter the parameter B. The filter 17 is used for further improving the estimates provided by the parameter estimation unit 15 or thresholding and re-estimation unit 16 in order to provide an improved estimate $\overline{B}$. The filter is for example arranged to work in accordance with a Minimum Mean Squared Error (MMSE) based smoothing method known in the art.

The quality of the interference estimate provided by the parameter B from the unit for parameter estimation 15 or thresholding and re-estimation unit 16 or the parameter $\overline{B}$ from the filter 17 depends on the number of pilots $y_2$ available. With a limited number of pilots, the interference estimate can be quite noisy. The variance can be reduced by applying filtering in a post-filtering unit 18.

The filter of the post-filtering unit 18 is for example a low-pass filter. For example, the low-pass filter can be denoted $$\hat{B}_m = \lambda \hat{B}_{m-1} + (1-\lambda) \bar{B}_m$$

where $\bar{B}_m$ is the parameter $\bar{B}$ fed from the filter 17 for slot m, $\hat{B}_m$ is the output from the post-filtering unit 18 for slot m and $\lambda$ is the forgetting factor of the IIR filter.

The low-pass filtering or the like in the post filtering unit 18 will reduce the variance of the interference estimate, which will improve SIR estimation. Another benefit is that filtering will slow down the fast power control loop, if there is remaining self interference due to the instantaneous fading profile. This will reduce variations in the signal power when the fast power control loop is close to becoming unstable.

The improved and post-filtered estimate $\hat{B}$ is fed to a unit 19 for calculating a modified SIR value. The modified SIR value with self-interference removed is in one embodiment of the calculation unit calculated as $$\text{modified SIR} = \beta_0^2 (1/\hat{B}) c^H R_n^{-1} c$$

wherein c are net channel coefficient estimates (proportional to the medium channel response estimates g using the transformation $R_p$ based on the known cumulative response of transmitter and receiver chip pulse shaping filters, as described above) and H is the Hermitian conjugate,
wherein $\beta_0^2$ represents the power setting of the code (this term may be omitted depending on how the net channel coefficients are estimated), for example $C_0$, in which the processed pilots $y_2$ are incorporated and
wherein $R_n$ is the noise covariance matrix calculated by the unit 14 for estimation of ISI and noise covariance matrices, as described above.

In one simple embodiment, it is for computational reasons assumed that the off-diagonal elements of $R_n$ are small. Then, the inverse of $R_n$ can be approximated by a diagonal matrix whose elements are the reciprocals of the diagonal elements of $R_n$. Thus, in accordance with this simple embodiment of the invention, the modified SIR value is calculated as $$\text{Modified } SIR = (1/\hat{B}) \sum_{k=1}^{L} \frac{S_k}{R_n(k,k)}$$

wherein $S_k$ is some estimate of the signal power on the k:th path, based for example on the pilot symbols.

The modified SIR value calculated by the unit 19 for calculating a modified SIR value is fed to the comparing unit 10 for comparison with the preset value, as described in relation to FIG. 2.

When estimating the self interference, or Intersymbol Interference, using the arrangement as described above, Rake fingers should be placed on all significant rays in the radio channel. If there are rays in the radio channel that are not covered by Rake fingers, these rays will give additional interference and the additional interference from these rays could not be identified as self interference, since the signals from these rays are not known in the receiver.

The additional interference will put an upper limit of the estimated SIR, $SIR_{limit}$. The actual limit will depend on power settings and the instantaneous fading profile of the user. If there is too much power in the rays not covered by Rake fingers, the SIR limit could become so low that there is a risk of occurring power rushes. Thus, it is important that enough Rake fingers are available in the receiver for the radio channels that might occur.

Accordingly, having enough Rake fingers is crucial when demodulating the pilot symbols used for SIR estimation. It is not as important when demodulating the data symbols, even though self interference is a problem also here. Due to fading, the power of the rays in the radio channel will vary. For proper estimation of the modified SIR value, it must be possible to remove the self interference, or Intersymbol Interference, during all time. Otherwise, there is a risk that the modified SIR value is limited too low, which would result in power rushes. On the other hand, for the data reception it is sufficient that the demodulated signal is good enough most of the time, in order to provide good data throughput.

Therefore, in one example of the invention, more Rake fingers are used for SIR estimation than for data demodulation. This is important if there are limitations in the hardware or processing power, so that the number of Rake fingers for data demodulation cannot be increased.

The above described processing in the processing unit 9 in order to provide the modified SIR value does not rely on knowing the power settings of all transmitted codes for the user. Now, an embodiment with an alternative processing unit 20 is described, in relation to FIG. 4, which can be used if the power settings $\{\beta_i^2\}_{i=0}^{N-1}$ of the transmitted codes are known. In this alternative embodiment, the power settings $\{\beta_i^2\}_{i=0}^{N-1}$ of the transmitted code along with the information about the spreading factor $SF_0$ are stored in a memory 22 of the processing unit 20. Inputs to the processing unit 20 in accordance with this alternative embodiment are the demodulated pilots $y_2$ derived from each finger output of the RAKE receiver, as described in relation to the embodiment described in relation to FIG. 3. The processing unit 20 is arranged to estimate the signal and noise power for each finger k on the code in which the pilot symbols $y_2$ are incorporated, e.g. $C_0$, estimate the total signal power over all codes for each finger k, using the signal power on the code $C_0$ and the power settings of the transmitted codes, estimate the self interference for signal power for each finger k as the contribution of the total signal power over all codes and all fingers except the finger k, compensate the interference estimates used when estimating SIR by removing the self interference.

Figure 4:
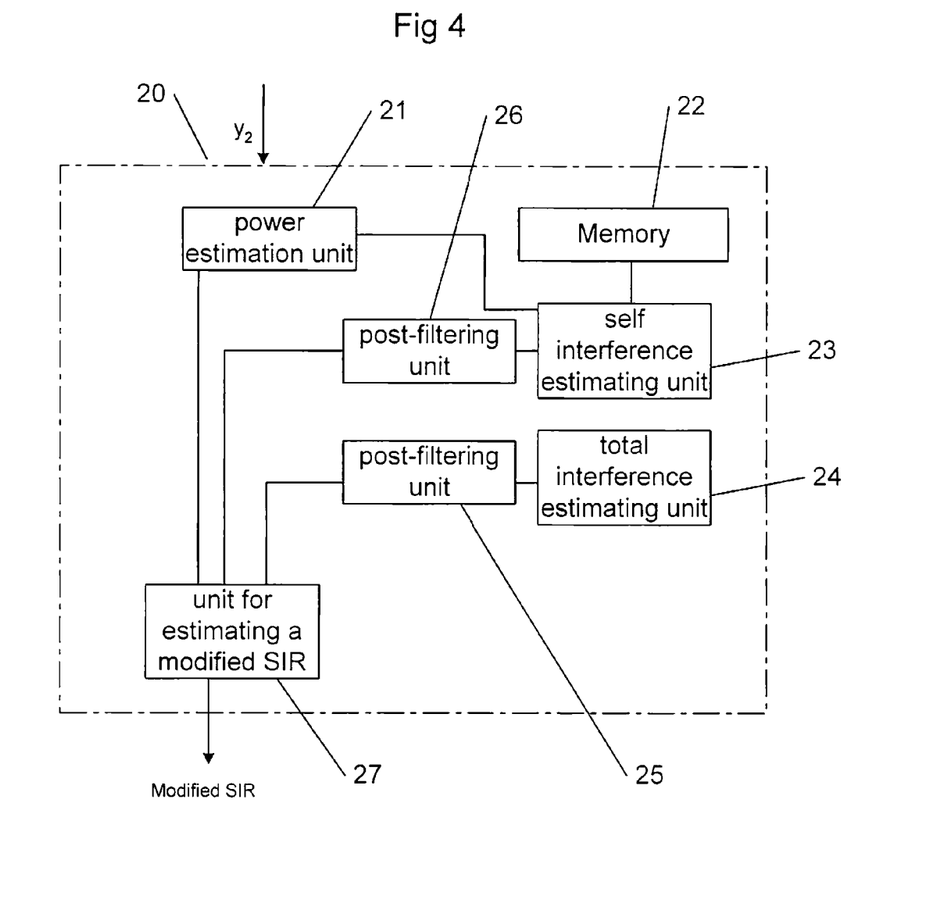
FIG. 4 shows a block diagram over a processing unit of the fast power control unit in FIG. 2 in accordance with an alternative example of the present invention.

An example of the calculations executed by the processing unit 20 in this alternative embodiment is given below. The signal powers $S_k$ are estimated in a power estimation unit 21 on the code $C_0$ using pilot symbols for each Rake finger k. The total interference powers $I_k$ are estimated in a total interference estimating unit 24 on the code $C_0$ using pilot symbols for each Rake finger k.

The self interference power is estimated in a self interference unit 23 as $$I_{k,self} = \frac{\left(\sum_{i=0}^{N-1} \beta_i^2\right) \cdot \left(\sum_{m=1, m \neq k}^{L} \frac{S_m}{\beta_0^2}\right)}{SF_0}.$$

The modified SIR is estimated in a unit 27 for estimating a modified SIR as $$SIR = \sum_{k=1}^{L} \frac{S_k}{I_k - I_{k,self}}$$

If the denominator is lower than a preset value, or negative, a maximum value $SIR_{max}$ for the modified SIR value is chosen instead. The modified SIR value provided in accordance with this embodiment is used by the fast power control unit 7, as described above.

One advantage of this alternative embodiment is that it is very simple and requires few computational steps. A drawback is that the current power settings $\{\beta_i^2\}_{i=0}^{N-1}$ of the user must be known. This could be solved by using blind detection $\beta_i$ factors.

For e.g. Enhanced Uplink in WCDMA, the power settings can be obtained by decoding the E-DPCCH control channel. This will introduce a delay in the interference estimate, since the control channel cannot be decoded until a complete transport block is received. The interference estimate from one transport block is used in the modified SIR estimation when receiving the next transport block. This assumes that blind detection is not used.

Also in this embodiment, it is important that a sufficient number of Rake fingers are available for demodulating the pilot symbols. Otherwise, not all self interference will be removed, which could limit the estimated modified SIR, as described in relation to FIG. 3.

Further, in order to reduce variance in the estimated interference, filtering of the interference estimates can be applied equivalent to the filtering function of the previously described post filtering unit 18. However, in this case, it is preferred to apply filtering to either the self interference estimate $I_{k,self}$ the total interference estimate $I_k$, or both.

Accordingly, the estimated total interference is in one example filtered in a post filtering unit 25 in accordance with the following equation
$I_{k,m} = \lambda I_{k,m-1} + (1-\lambda) I_{k,m}$ for slot m, where $\lambda$ is the forgetting factor of the IIR filter.

The estimated self interference is in one example filtered in a post-filtering unit 26 in accordance with the following equation
$I_{k,self,m} = \lambda I_{k,self,m-1} + (1-\lambda) I_{k,self,m}$ for slot m, where $\lambda$ is the forgetting factor of the IIR filter.

To sum up, when the power settings of the user is known e.g. by decoding control channel information, the filtered self interference is removed from the filtered total interference in the algorithm $$\text{modified } SIR = \sum_{k=1}^{L} \frac{S_k}{I_{k,m} - I_{k,self,m}}.$$

Figure 5:
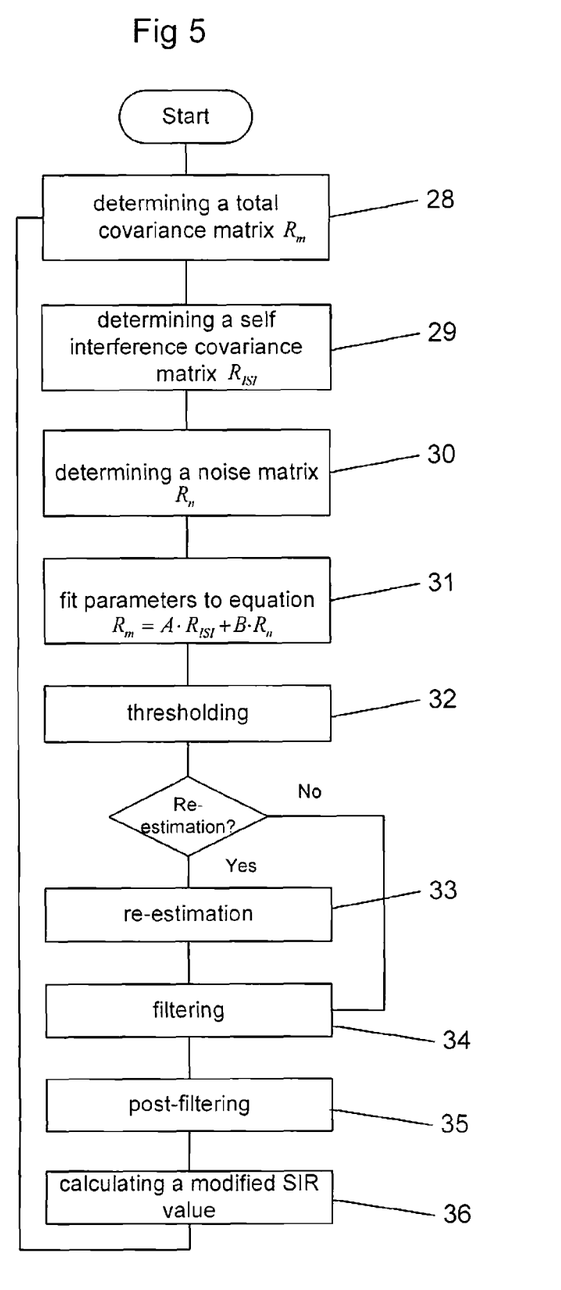
FIG. 5 shows a flow chart of the processing of the processing unit in accordance with the example as described in FIG. 3.

In FIG. 5, a method for continuously updating a quality measure of a radio channel involves continuously determining a modified Signal to Interference plus noise ratio (SIR) in which the influence from self interference has been removed.

In detail, the method involves the steps of
determining 29 a self interference covariance matrix $R_{ISI}$, scaled by a first fitting parameter A and continuously updated based on at least received demodulated pilots and path delays in the radio channel,
determining 30 a noise covariance matrix $R_n$ scaled by a second fitting parameter B,
adapting 31 the first and second fitting parameters A, B to fit a model of the radio channel to measured received pilots for example by using a Least Square method, and
determining 36 the modified SIR as a relation between a signal power or the like, the second parameter B and the noise impairment term $R_n$.

The model of the radio channel is for example described by the equation $R_m = A \cdot R_{ISI} + B \cdot R_n$, and is determined by estimating 28 a total covariance matrix $R_m$ based on at least received demodulated pilots.

In accordance with the described example, the method further comprises the steps of determining 32 when the fitted first parameter A decreases below a preset value, to thereupon set the first parameter A to zero and to re-estimate 33 the second parameter B. The second, possibly re-estimated, parameter B is then filtered 34 with a Minimum Mean Squared Error (MMSE) based smoothing method. The possibly re-estimated and filtered second parameter B is then post-filtered 35 in a low-pass filtering process before determining 36 the modified SIR.

Figure 6:
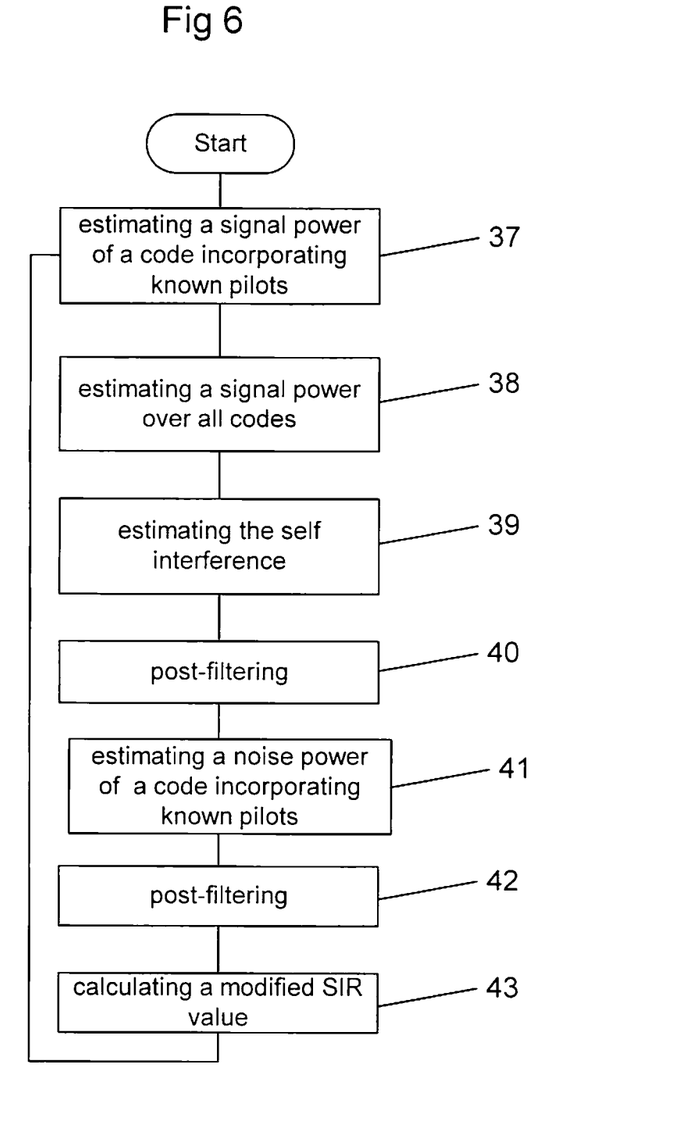
FIG. 6 shows a flow chart of the processing of the processing unit in accordance with the example as described in FIG. 4.

In FIG. 6, an alternative method for continuously updating a quality measure of a radio channel involves continuously determining a modified Signal to Interference plus noise ratio (SIR) in which the influence from self interference has been removed.

In detail, a signal power or the like is estimated 37 of pilots or a code in which the pilots are incorporated from each finger output of a RAKE receiver. Further, a noise power or the like is estimated 41 of pilots or a code in which the pilots are incorporated from each finger output of a RAKE receiver. The estimated noise power is then post-filtered 42 in a filter having low pass characteristics. Also, the total signal power or the like over all codes is estimated 38 for each finger output using the signal power or the like on the pilots or the code in which the pilots are incorporated and known power settings of the transmitted codes. The self interference is estimated 39 for each finger output as the contribution of the total signal power or the like over all codes and all finger outputs except the finger output for which the self interference is estimated. The estimated self interference is then post-filtered 40 in a filter having low pass characteristics. The modified SIR value is calculated based on the estimated signal power, post-filtered self interference estimates and post-filtered noise power estimates.

The invention claimed is:

1. A receiver comprising a fast power control unit, said fast power control unit being arranged to continuously control a quality measure of a radio channel, wherein the quality measure is a modified Signal to Interference plus noise ratio (SIR) in which an influence from self interference has been removed, wherein
the fast power control unit comprises a processing unit comprising a model of the radio channel determined at least based on known, demodulated pilots, said model comprising a self interference impairment term $R_{ISI}$ scaled by a first fitting parameter A and a noise impairment term $R_n$ scaled by a second fitting parameter B,
the processing unit is arranged to adapt values of the first and second fitting parameters A, B to fit the model to measured received pilots,
the processing unit is arranged to determine that the radio channel has a high Carrier to Interference ratio and is a dispersive channel, thus requiring determination of the modified SIR;
the processing unit is arranged to determine the modified SIR as a relation between a signal power, the second fitting parameter B and the noise impairment term $R_n$ without employing the self interference impairment term $R_{ISI}$;
the processing unit is arranged to determine when the first fitting parameter A decreases below a preset value, and thereupon set the first fitting parameter A to zero, re-estimate the value of the second fitting parameter B, and use the re-estimated second fitting parameter B in determining the modified SIR;

wherein the receiver further comprises a RAKE receiver operatively connected to the fast power control unit and arranged to feed known pilots from the respective finger outputs of the RAKE receiver to the fast power control unit;

wherein the RAKE receiver comprises at least one finger output for each significant fading path in the radio channel; and wherein the number of finger outputs of the RAKE receiver fed to the fast power control unit is larger than the number of finger outputs fed to a RAKE combiner for data processing.

2. A receiver according to claim 1, wherein the processing unit is arranged to determine the first and second fitting parameters A, B by means of a Least Square method.

3. A receiver according to claim 1, wherein the model of the radio channel is described by the equation $R_m = A \cdot R_{ISI} + B \cdot R_n$, wherein the processing unit is arranged to estimate a total covariance matrix $R_m$ based on at least received demodulated pilots, wherein the self interference impairment term $R_{ISI}$ is a self interference covariance matrix and wherein the noise impairment term $R_n$ is a noise covariance matrix.

4. A receiver according to claim 3, wherein the processing unit is arranged to continuously update the self interference covariance matrix $R_{ISI}$ based on at least received demodulated pilots and path delays in the radio channel.

5. A receiver according to claim 1, wherein the processing unit is arranged to filter a possibly re-estimated second fitting parameter B with a Minimum Mean Squared Error based smoothing method and to use the filtered second fitting parameter B in determining the modified SIR.

6. A receiver according to claim 1, wherein the processing unit is arranged to post-process a possibly re-estimated and/or filtered second fitting parameter B in a post-filtering unit before determining the modified SIR, said post-filtering unit comprising a filter having low-pass characteristics.

7. A receiver according to claim 1, wherein the receiver is a CDMA receiver.

8. A receiver according to claim 1, wherein the fast power control unit is arranged to compare the determined quality measure with a predetermined quality value and to based on said comparison broadcast a message to a transmitter for amending the transmitting power.

9. A receiver according to claim 1, wherein the receiver is embodied in a wireless communication terminal for use in a wireless communication network.

10. A receiver according to claim 1, wherein the receiver is embodied in a radio base station for use in a wireless communication network.

11. A receiver comprising a fast power control unit, said fast power control unit being arranged to continuously control a quality measure of a radio channel, wherein the quality measure is a modified Signal to Interference plus noise ratio (SIR) in which an influence from self interference has been removed, wherein the fast power control unit comprises a first processing unit comprising a model of the radio channel determined at least based on known, demodulated pilots, said model comprising a self interference impairment term $R_{ISI}$ scaled by a first fitting parameter A and a noise impairment term $R_n$ scaled by a second fitting parameter B, the first processing unit is arranged to adapt values of the first and second fitting parameters A, B to fit the model to measured received pilots, the first processing unit is arranged to determine that the radio channel has a high Carrier to Interference ratio and is a dispersive channel, thus requiring determination of the modified SIR;

the first processing unit is arranged to determine the modified SIR as a relation between a signal power, the second fitting parameter B and the noise impairment term $R_n$ without employing the self interference impairment term $R_{ISI}$;

the processing unit is arranged to determine when the first fitting parameter A decreases below a preset value, and thereupon set the first fitting parameter A to zero, re-estimate the value of the second fitting parameter B, and use the re-estimated second fitting parameter B in determining the modified SIR;

wherein the receiver further comprises a second processing unit arranged to calculate the self interference comprising:

a power estimation unit arranged to:
estimate a signal power and a noise power of the pilots or a code in which the pilots are incorporated from each RAKE finger output, and to
estimate the total signal power over all codes for each finger output using the signal power on the pilots or the code in which the pilots are incorporated and known power settings of the transmitted codes, and a self interference estimating unit arranged to estimate the self interference for each finger output as the contribution of the total signal power over all codes and all finger outputs except the finger output for which the self interference is estimated.

12. A receiver according to claim 11, wherein the receiver comprises a post-filtering unit arranged to filter the self interference estimated in the self interference estimating unit by means of a filter having low-pass characteristics.

13. A receiver according to claim 11, wherein the receiver comprises a total interference estimating unit arranged to estimate the total interference for each finger output.

14. A receiver according to claim 13 wherein the receiver comprises a post-filtering unit arranged to filter the total interference estimated in the total interference estimating unit by means of a filter having low-pass characteristics.

15. A receiver according to claim 14 wherein the receiver comprises a SIR estimation unit arranged to estimate the modified SIR as a ratio between an estimated signal power and a difference between a possibly post-filtered self interference and a possibly post-filtered total interference.

16. A method for continuously controlling a quality measure of a radio channel, comprising continuously determining a modified Signal to Interference plus noise ratio (SIR) in which an influence from self interference has been removed, the continuous determination of the modified SIR comprising the steps of determining a self interference impairment term $R_{ISI}$ scaled by a first fitting parameter A, determining a noise impairment term $R_n$ scaled by a second fitting parameter B, adapting the first and second fitting parameters A, B to fit a model of the radio channel to measured received pilots, determining that the radio channel has a high Carrier to Interference ratio and is a dispersive channel, thus requiring determination of the modified SIR;

determining the modified SIR as a relation between a signal power, the second fitting parameter B and the noise impairment term $R_n$ without employing the self interference impairment term $R_{ISI}$;

determining when the first fitting parameter A decreases below a preset value, and thereupon setting the first fitting parameter A to zero, re-estimating the second fitting parameter B, and using the re-estimated second fitting parameter B in determining the modified SIR;

using a RAKE receiver to feed known pilots from respective finger outputs of the RAKE receiver to a fast power control unit;

wherein the RAKE receiver comprises at least one finger output for each significant fading path in the radio channel; and wherein the number of finger outputs of the RAKE receiver fed to the fast power control unit is larger than the number of finger outputs fed to a RAKE combiner for data processing.

17. A method according to claim 16, wherein the first and second fitting parameters A, B are fitted by means of a Least Square method.

18. A method according to claim 16, wherein the model of the radio channel is described by the equation $R_m = A \cdot R_{ISI} + B \cdot R_n$, and is determined by estimating a total covariance matrix R, based on at least received demodulated pilots, wherein the self interference impairment term $R_{ISI}$ is a self interference covariance matrix and wherein the noise impairment term $R_n$ is a noise covariance matrix.

19. A method according to claim 18, wherein the self interference covariance matrix is continuously updated based on at least received demodulated pilots and path delays in the radio channel.

20. A method according to claim 19, comprising the step of filtering a second, possibly re-estimated, fitting parameter B with a Minimum Mean Squared Error based smoothing method, wherein the filtered second fitting parameter B is used in determining the modified SIR.

21. A method according to claim 16, comprising the step of post-filtering a possibly re-estimated and/or filtered second fitting parameter B in a low-pass filtering process before determining the modified SIR.

22. The method of claim 16, wherein said method is used for fast power control, and further comprises the steps of
continuously controlling a quality measure of a radio channel,
comparing the determined quality measure with a predetermined quality value, and
based on said comparison broadcasting a message to a transmitter for amending the transmitting power.

23. A method for continuously controlling a quality measure of a radio channel, comprising continuously determining a modified Signal to Interference plus noise ratio (SIR) in which an influence from self interference has been removed, the continuous determination of the modified SIR comprising:

determining a self interference impairment term $R_{ISI}$ scaled by a first fitting parameter A, determining a noise impairment term $R_n$ scaled by a second fitting parameter B, adapting the first and second fitting parameters A, B to fit a model of the radio channel to measured received pilots, determining that the radio channel has a high Carrier to Interference ratio and is a dispersive channel, thus requiring determination of the modified SIR;

determining the modified SIR as a relation between a signal power, the second fitting parameter B and the noise impairment term $R_n$ without employing the self interference impairment term $R_{ISI}$;

determining when the first fitting parameter A decreases below a preset value, and thereupon setting the first fitting parameter A to zero, re-estimating the second fitting parameter B, and using the re-estimated second fitting parameter B in determining the modified SIR;

estimating a signal power and estimating a noise power of pilots or a code in which the pilots are incorporated from each finger output of the RAKE receiver, estimating the total signal power over all codes for each finger output using the signal power on the pilots or the code in which the pilots are incorporated and known or blind detected power settings of the transmitted codes, and estimating the self interference for each finger output as the contribution of the total signal power over all codes and all finger outputs except the finger output for which the self interference is estimated.

* * * * *